United States Patent [19]
May et al.

[11] Patent Number: 6,160,719
[45] Date of Patent: Dec. 12, 2000

[54] CUSTOM DOCKING TRAY FOR EMI REDUCTION

[75] Inventors: Gregory J. May; Andrew L. Van Brocklin, both of Corvallis; James R. Cole, Albany; Richard Vu, Corvallis, all of Oreg.

[73] Assignee: Hewlett-Packard Company, Palo Alto, Calif.

[21] Appl. No.: 09/178,880

[22] Filed: Oct. 26, 1998

[51] Int. Cl.$^7$ ........................................................ H05K 9/00
[52] U.S. Cl. .......................... 361/816; 361/683; 361/686; 361/816; 361/818; 174/35 R; 174/51
[58] Field of Search ..................................... 361/736, 737, 361/816, 818, 685, 686; 439/159; 174/35 R, 35 GC, 51; 395/827; 235/472

[56] References Cited

U.S. PATENT DOCUMENTS

| | | | |
|---|---|---|---|
| 4,232,512 | 11/1980 | Yoshikawa et al. | 360/82 |
| 4,697,073 | 9/1987 | Hara | 235/487 |
| 5,234,536 | 8/1993 | Parthasarathi et al. | 156/633 |
| 5,379,213 | 1/1995 | Derks | 364/411 |
| 5,402,310 | 3/1995 | Penniman | 361/686 |
| 5,447,442 | 9/1995 | Swart | 439/77 |
| 5,468,947 | 11/1995 | Danielson et al. | 235/686 |
| 5,644,516 | 7/1997 | Podwahny et al. | 364/708.1 |
| 5,667,596 | 9/1997 | Tsuzuki et al. | 136/256 |
| 5,887,501 | 3/1999 | Ivan et al. | 250/70.09 |
| 5,892,971 | 4/1999 | Danielson et al. | 235/472 |
| 5,987,545 | 11/1999 | Oh | 710/100 |
| 6,028,767 | 2/2000 | Lan | 361/686 |

OTHER PUBLICATIONS

Docking Station NEC Versa–Family Option.

*Primary Examiner*—Jeffrey Gaffin
*Assistant Examiner*—Tuan Dinh

[57] ABSTRACT

There is provided an apparatus for docking a piece of portable equipment, such as a portable computer, with another device, such as a peripheral device. In particular, there are a plurality of different pieces of equipment, essentially similar in function but different in design particulars, such as a manufacturer's line of different portable computer models. The docking apparatus includes a first module which has standard interfaces for peripheral devices, and is designed to couple with one of a set of second modules. Each one of the second modules is customized for a respective one of the pieces of equipment. For instance, if each of the portable computers has an external monitor interface, but the monitor interfaces are located at different positions on the different portable computers, then the respective second modules are designed to accommodate the monitor interfaces at the different positions, but to enable all of the monitor interfaces to couple with the external monitor, preferably through the first module. The pieces of equipment and the docking stations, then, must be EMI compliant when docked together. In accordance with the invention, the second module bears EMI shielding and coupling structures for making the overall docked system EMI compliant.

11 Claims, 7 Drawing Sheets

CUSTOM DOCKING TRAY FOR EMI REDUCTION

FIELD OF THE INVENTION

The invention generally relates to the field of reducing ElectroMagmetic Interference (EMI) emissions from electronic equipment. More specifically, the invention relates to portable computers, and to docking station apparatus for using portable computers in a "desktop-replacement" mode.

BACKGROUND OF THE INVENTION

All electronic equipment radiates electromagnetic energy as it operates. To prevent such emissions from interfering with the operation of other nearby equipment, and to comply with emissions standards set by bodies such as the Federal Communications Commission, electronic equipment is designed to provide shielding or coupling which limits the EMI from the equipment. Designing equipment for EMI compliance includes both electronic and physical design considerations. Also, a piece of equipment must be EMI-compliant in different, realistic operating modes, including any mode of operation which is worst-case for EMI radiation. Therefore, there is a continuing need for creative approaches to the problem of EMI compliance.

SUMMARY OF THE INVENTION

There is provided an apparatus for docking a piece of portable equipment, such as a portable computer, with another device, such as a peripheral device. In particular, there are a plurality of different pieces of equipment, essentially similar in function but different in design particulars, such as a manufacturer's line of different portable computer models. The docking apparatus includes a first module which has standard interfaces for peripheral devices, and is designed to couple with one of a set of second modules. Each one of the second modules is customized for a respective one of the pieces of equipment. For instance, if each of the portable computers has an external monitor interface, but the monitor interfaces are located at different positions on the different portable computers, then the respective second modules are designed to accommodate the monitor interfaces at the different positions, but to enable all of the monitor interfaces to couple with the external monitor, preferably through the first module.

The pieces of equipment and the docking stations, then, must be EMI compliant when docked together. In accordance with the invention, the second module bears EMI shielding and coupling structures for making the overall docked system EMI compliant.

The invention advantageously provides EMI-compliance on a per-model basis. If different models of equipment have different EMI needs while coupled to the docking station, but are otherwise EMI compliant when operating stand-alone, then implementation of the shielding and coupling structures makes it possible for the manufacturer to release and ship the equipment without delay, while EMI compliance is being developed for the equipment/docking station system. Also, it is easier and less costly to design EMI-compliance structures for a single model than to design a single EMI structure which satisfies all the models (present and future) of a manufacturer's line.

DETAILED DESCRIPTION OF THE PREFERRED EMBODIMENTS

The discussion which follows will focus primarily on portable computers, also called "laptop" or "notebook" computers. In a desktop replacement mode of operation, a user docks or undocks the notebook with a docking station which remains at a fixed location (e.g., a work station). Peripheral devices, such as a full-size monitor, keyboard, CD-ROM drive, etc., are coupled to the docking station, and also remain at the work station. Such arrangements include extra conductive elements, such as cables, which are not present when the notebook computer is used stand-alone. Thus, EMI issues, which may differ from the notebook's EMI issues in stand-alone mode, arise in connection when the notebook is coupled to the docking station.

However, the invention is not limited to addressing these EMI issues only for notebook computers. In general, the invention applies to other types of electronic equipment which require EMI compliance both stand-alone and when coupled to other equipment.

CONVENTIONAL DOCKING STATION EMI COMPLIANCE

Conventionally, a manufacturer of a line of notebook computers also develops several docking or port replicator products to support the notebook computers. These accessories will be referred to as "plafforms" or "docks", with the understanding that any other accessories of this type are contemplated, as well.

These notebooks are designed to be EMI compliant when operating stand-alone. These EMI-compliant notebooks may be shipped as stand-alone products. Manufacturers regard this as important, because the market is very competitive. Once developed, a notebook computer model must reach the market within no more than a month or two, before it begins to grow obsolete. Also, inventory which builds up before an EMI-compliant product is released rapidly loses value.

EMI fixes are implemented on these platforms that are dedicated to specific notebooks. When an accessory, such as a docking station or port replicator, is developed for use with a notebook computer, separate EMI testing and compliance is required for the overall system, made up of the notebook and the docking station together. (The system may represent the worst case configuration for EMI. Regulatory agencies, such as the Federal Communications Commission (FCC), require EMI testing in the worst case of normal user configurations.)

If the system is not EMI compliant, even though the notebook is EMI-compliant by itself, then EMI work must be done on the docking station to allow the system to pass regulatory testing. EMI compliance is achieved using known shielding or field coupling structures, such as filters or modify ground connections or coupling paths. EMI solutions are often found empirically, and achieving EMI compliance can be an art, as well as a science.

Conventionally, where a docking station is dedicated to one notebook, certain EMI structures on the docking station are sufficient to make the notebook, in a docked configuration, EMI compliant.

Figures 1, 2:
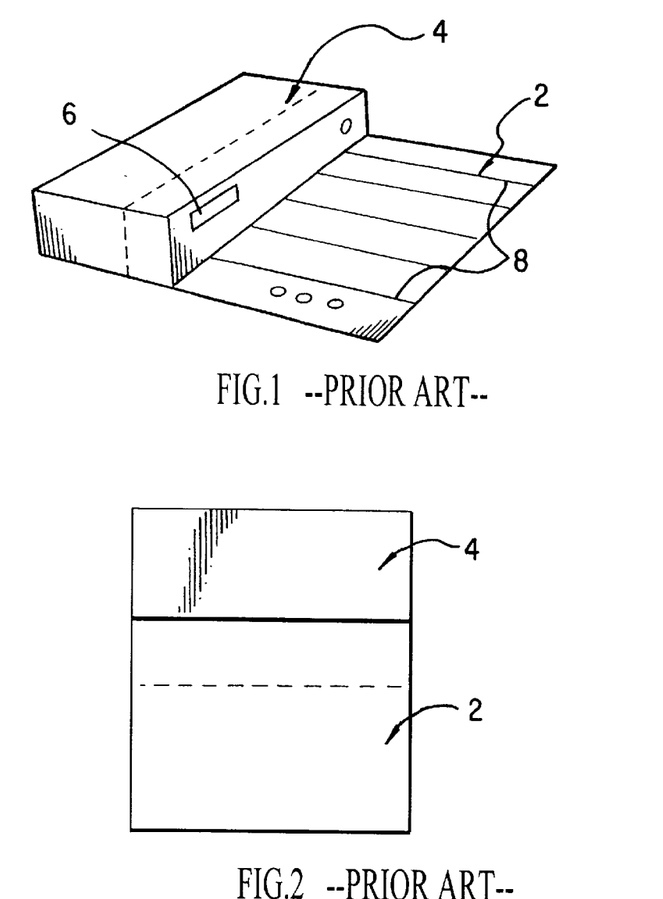
FIG. 1 is a perspective view of a first prior art computer docking station apparatus.
FIG. 2 is a top view of the prior art apparatus of FIG. 1.
Figure 3:
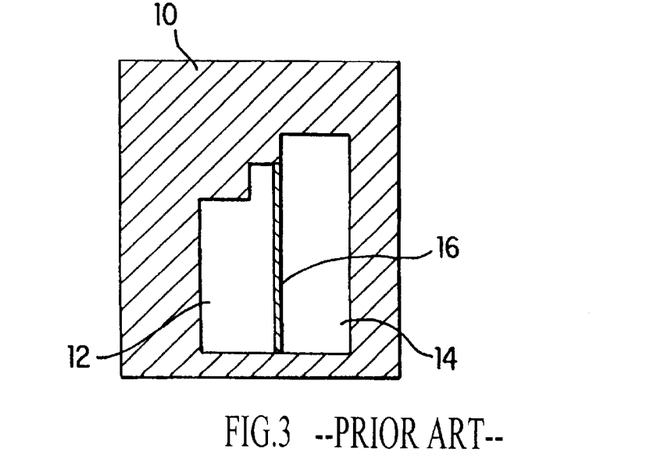
FIG. 3 is a bottom view of the prior art apparatus of FIG. 1, showing an EMI structure.

For instance, FIGS. 1, 2, and 3 are three simplified views of Hewlett-Packard Company's (HP's) F1098A Enhanced Port Replicator product, which is used in connection with HP's Omnibook 4000 notebook computer product. As shown in the perspective view of FIG. 1 and in the top view of FIG. 2, the F1098A product essentially includes a bed 2 and an interface section 4. When docked, the notebook rests on the bed 2. Interfaces on the back of the notebook engage interface ports, such as an interface port 6, on the interface section 4. An alignment structure on the bed 2, in this case tracks 8, align the notebook so that its interface is properly positioned to engage the interface port 6. It will be understood that, for proper alignment, the bed 2, including the tracks 8, and also the positioning of the interface, must be custom designed for compatibility with the particular model of notebook computer to be used.

It was found that EMI "noise" was radiated by a loop antenna phenomenon, and that an EMI shielding and coupling structure shown in the bottom view of FIG. 3 reduced the noise to achieve system EMI compliance. A structure 10 in the bed 2 includes a cutaway area having sections 12 and 14, bisected by a tuning strip 16. The cutaway area was found to reduce coupling from the bottom of the notebook to the chassis of the F1098A product.

A more complex problem arises when different notebooks on a common dock cause the system to require different EMI fixes. All too often, an EMI fix on the dock for one notebook causes non-compliance with another notebook.

Figure 4:
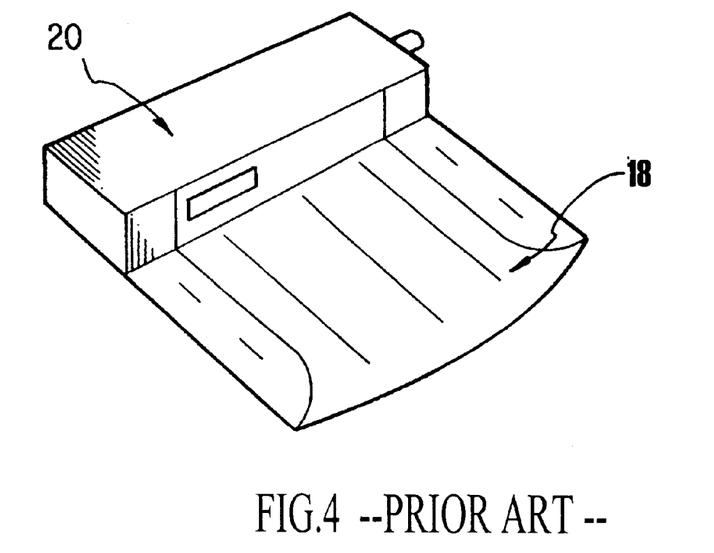
FIG. 4 is a perspective view of a second prior art computer docking station apparatus.
Figure 5:
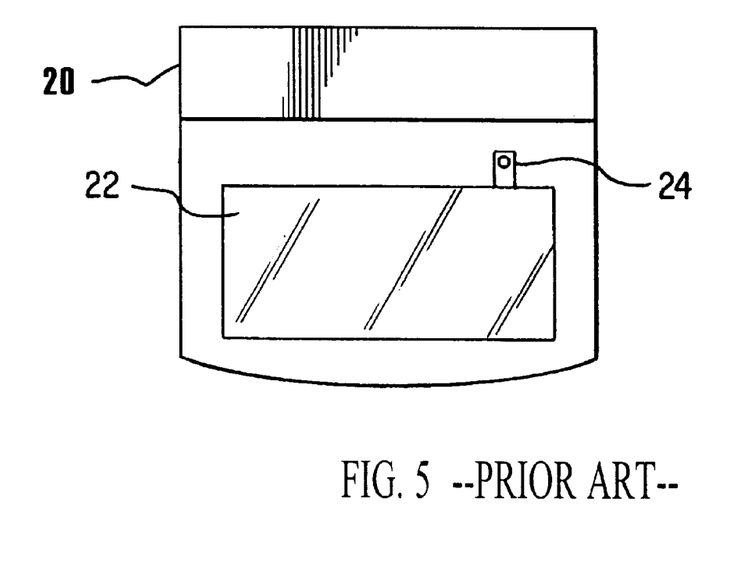
FIG. 5 is a bottom view of the prior art apparatus of FIG. 4, showing an EMI structure.

FIGS. 4 and 5 are a perspective view and a bottom view, respectively, of HP's F1349A port replicator product, which is designed to accommodate HP's Omnibook 5500, 5700, and 2000 series notebook computer products. Again, the port replicator includes a bed 18 for the notebooks, and an interface portion 20.

In the bottom view of FIG. 5, a metal plate 22 is provided. To increase coupling between chassis ground and the docked notebooks, a screw coupling 24 conducts from the plate 22 to ground inside the interface portion 20 of the port replicator product. It was found that the above-referenced Omnibook products placed different EMI compliance requirements on the port replicator structure. The plate 22, a large rectangular structure, was found to be the best solution for the two products using the same dock. Typically what works for one hurts another or does not do enough to solve the problem for both machines. The plate 22 was the resulting compromise, although it added cost and manufacturing complexity to the port replicator product.

In summary, these prior art structures illustrate the need for a better approach to EMI compliance in docking structures.

THE CUSTOM DOCKING SYSTEM

A structure is provided for customizing the EMI compliance requirements of notebook-docking station systems, through an enhancement of the invention described in co-pending, co-assigned U.S. patent application Ser. No. 09/179,241 filed Oct. 26, 1998. "Mechanism for Insertion and Removal of Adapter Trays of a Docking Station." In that application, there is disclosed an apparatus for docking any of a family of notebooks to a common peripheral interface.

Figure 6:
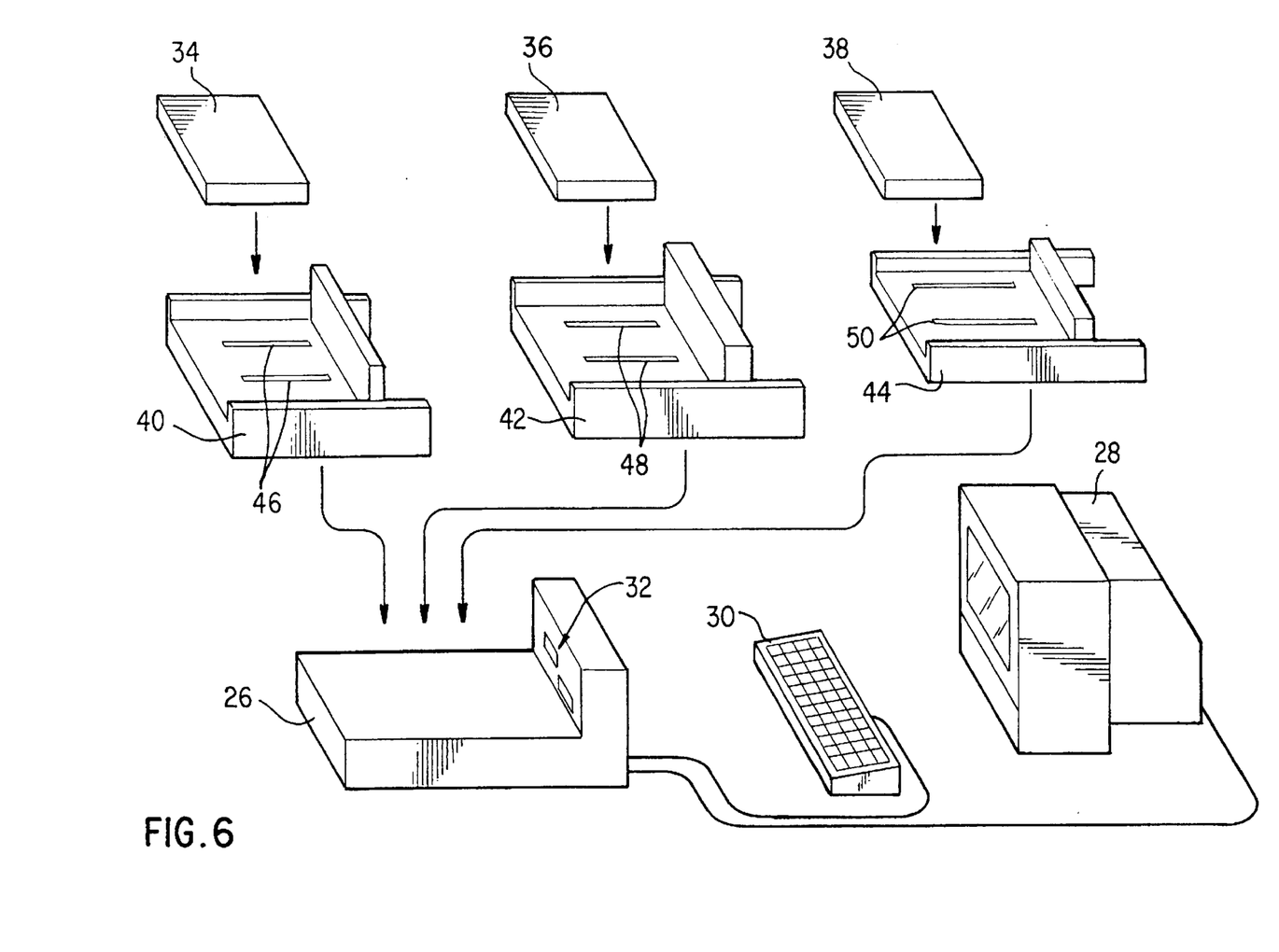
FIG. 6 is a simplified, exploded perspective view of a docking system environment in which the EMI compliance structures of the invention are employed.

FIG. 6 is a simplified perspective view, in exploded form, of a docking system as per the 09/179,241 application. A standard first docking module 26 is coupled to the peripheral, shown here as a video monitor 28 and a full-size keyboard 30. The first docking module 26 has a standard interface, generally shown as 32.

The docking system is designed to accommodate any of three illustrated notebook computers, shown as 34, 36, and 38. The notebooks 34, 36, and 38 have interfaces which are essentially equivalent in functionality, but which are not physically identical. For instance, each of the notebooks 34, 36, and 38 may have a standard external terminal interface, but the interfaces may be located at different positions on the respective notebooks.

To make each of the notebooks compatible with the first docking module 26, respective second docking modules 40, 42, and 44 are shown. Each of the second docking modules is compatible with the first docking module 26, for mechanical coupling therewith. In a preferred embodiment, the 09/179,241 application describes second modules configured as trays for holding the respective notebooks.

Each of the second docking modules corresponds with a respective one of the notebooks, and includes guide members such as tracks 46, 48, and 50, for holding the notebooks in position. Preferably, the notebooks are positioned for aligning interfaces on the notebooks with the interface 32 on the first module. The second docking modules also have different thicknesses, or vertical dimensions. For notebook computers having different thicknesses, or having interface connectors positioned at different heights above their bottom surfaces, the second docking modules hold the notebooks' connectors at the right height to engage the interface 32.

THE INVENTION

With the advent of a custom docking system such as the above-described common dock with customizing trays, it is now possible, in accordance with the present invention, also to customize the EMI fix for each notebook, by placing the EMI-compliance shielding and field coupling structure on the customizing tray. The invention tunes the EMI compliance solution to each respective notebook to be used with the docking system. Advantageously, cost is added to one tray solution only as required for that tray solution, without adding cost to any other solution. (Of course, if a given one of the notebooks, in the docked configuration, is already EMI compliant, then there is no need for any shielding and field coupling structure on that tray.)

It is also advantageous that the invention allows for the possible development of EMI solutions at a time later than the product announcement or shipping dates for the notebook itself. Thus, development of the custom EMI fix for the dock (metallization, PC circuit antenna, inductive or capacitive coupling, etc.) would not affect the notebook that is using the dock, and would not prevent the notebook from shipping on a schedule different from that of the dock. Future notebooks using the same dock could have another special tray that solves its own EMI problems or tuning.

Figure 7:
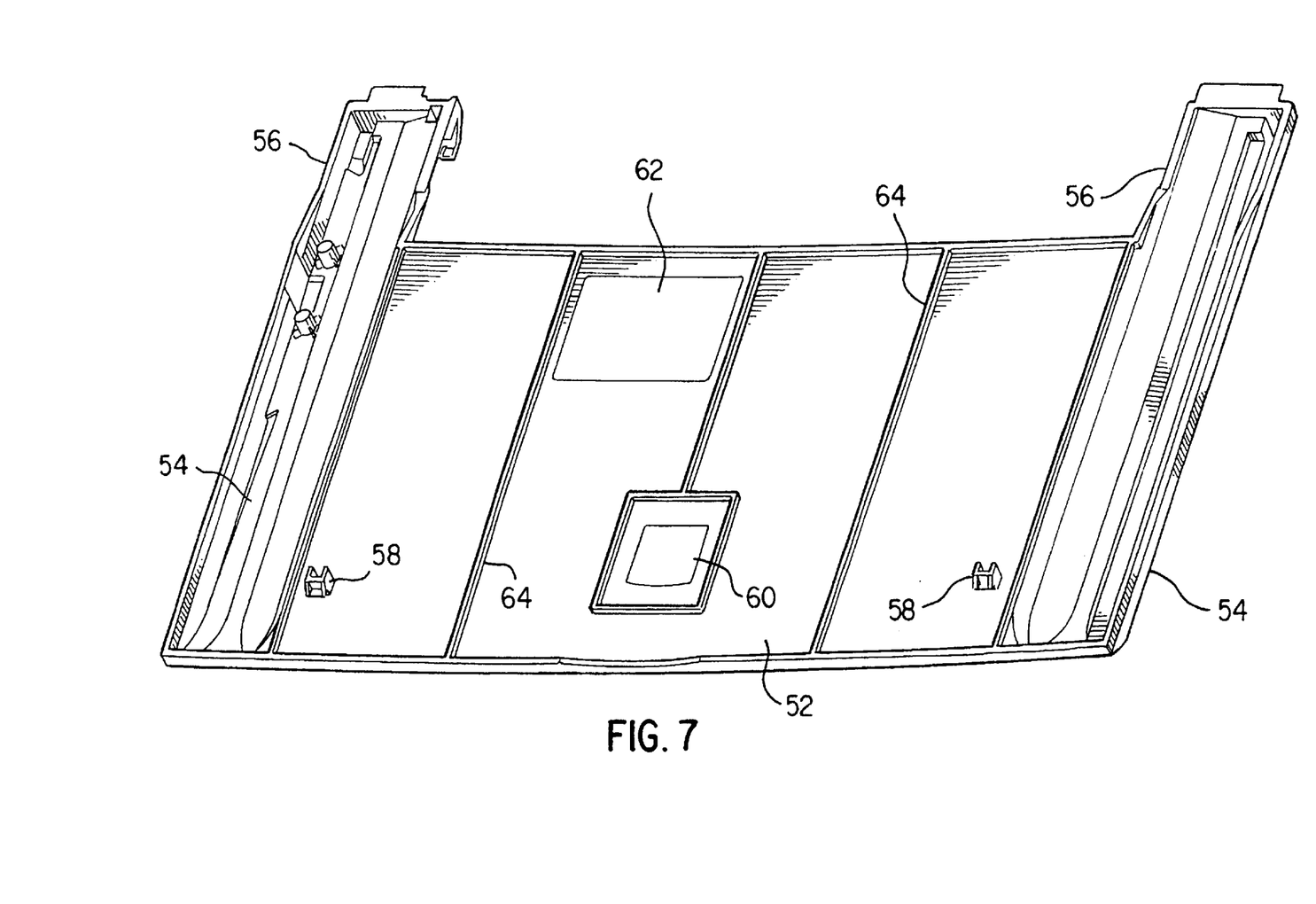
FIG. 7 is a detailed perspective view, from the bottom, of one of the docking station modules of FIG. 6.
Figure 8:
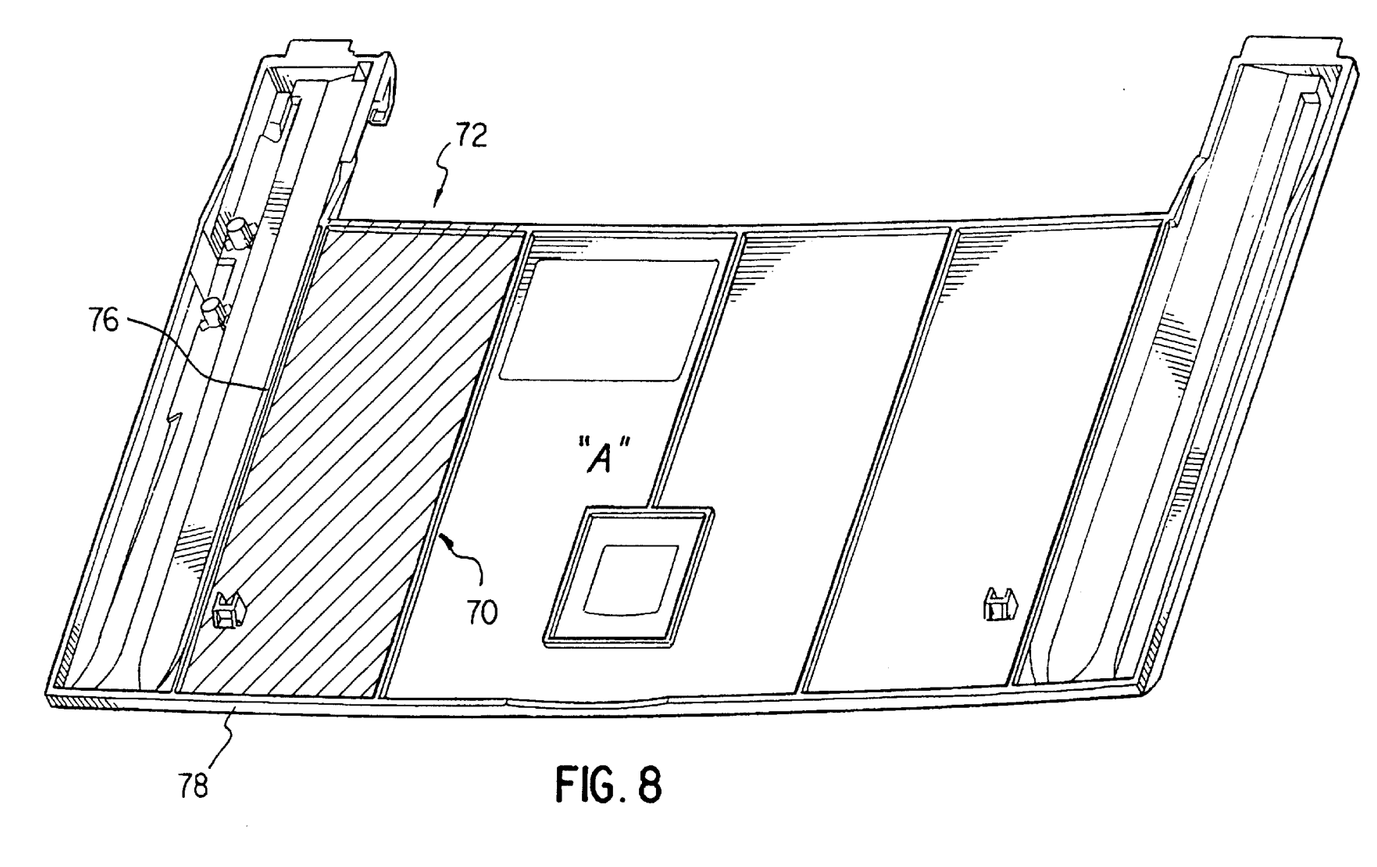
FIG. 8 is a perspective view, from the bottom, of a docking module, similar to that of FIG. 7, including a first embodiment of the invention.
Figure 9:
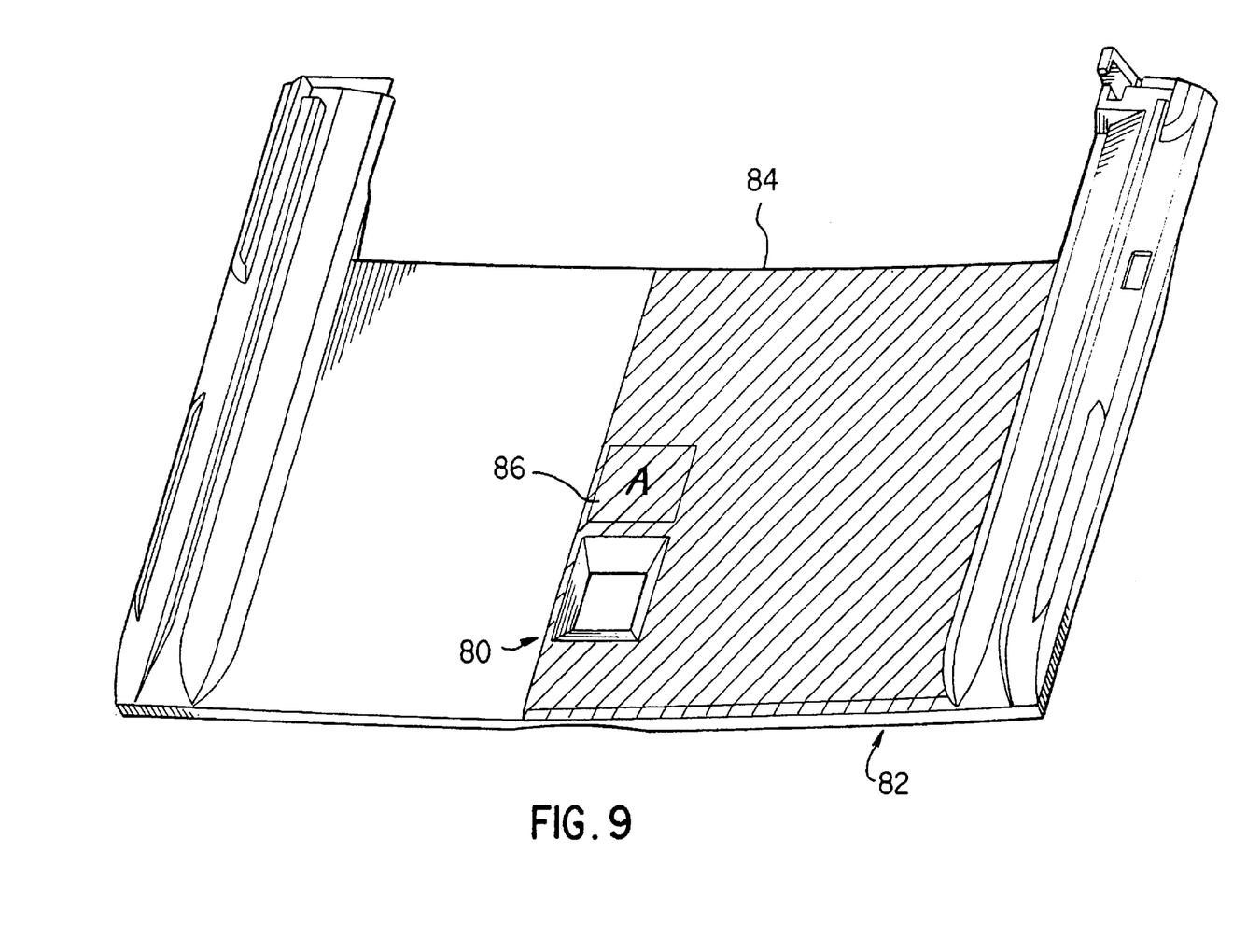
FIG. 9 is a perspective view, from the top, of a docking module, similar to that of FIG. 7, including a second embodiment of the invention.

PREFERRED EMBODIMENTS—FIGS. 7, 8, AND 9

FIG. 7 is a detailed perspective view of a docking station tray without an EMI compliance structure. First, a brief discussion will be given of the structural features of the docking station tray, as shown. Then, a discussion of preferred embodiments of the invention will describe various ways of providing EMI compliance according to the invention.

As stated above, the second module of the docking apparatus according to the invention is preferably implemented as a tray. A flat tray surface 52 is provided for supporting the portable computer, or other piece of equipment. A structure is provided for coupling the second module with the first module. In the tray configuration shown, that coupling structure includes side rails 54 and skids 56, which fit over the first module.

Additional guide members, such as projections 58 may be engaged with corresponding apertures in the first module, for accurately positioning the second module. As disclosed in the co-pending 09/179,241 patent application, notebook computers of different dimensions, having interface connectors at relative positions thereon, are positioned by the different, custom-designed trays, so that their interface connectors line up with the interface connector on the first module. Therefore, such accurate positioning of the second modules on the first module is also important.

At a suitable position, such as within the surface 52, a lock aperture 60 is provided for allowing a mechanical security latch within the first module to engage the docked notebook computer. A label 62 is provided, bearing visible, easily readable information, such as a legend identifying which model of notebook computer is to be used with this one of the trays.

The tray is designed for compatibility with the dimensions of the notebook with which the tray is to be used. The tray holds the notebook at a suitable height and lateral positioning so that a peripheral interface on the tray aligns with the interface on the first module, so the interfaces engage each other. One way to do this is to give the surface 52 a suitable overall thickness. Another, preferred way, which lightens the second module and saves material costs in its manufacture, is to provide a lifting structure, such as ribs 64. The ribs 64 extend from the surface 52 a suitable altitude such that the docked notebook will be supported at a height, over the first module, to align the interfaces. The ribs 64 also give the second module added structural strength.

EMI structures are added to the second "tray" module just described, to interact with fields generated by the notebook and associated equipment, and bring about the needed EMI compliance. In accordance with the invention, a wide variety of different structures may be added to the basic tray structure of FIG. 7. Techniques which would be known to EMI designers, such as grounding the conductive EMI structures, etc., are employed.

Empirical experimentation, for a given notebook, will likely lead to the best EMI compliance solution. In general, it will be simple and inexpensive to place a conductive layer on part or all of the surface of the tray, to enhance or decrease coupling between devices.

Two examples, illustrated in FIGS. 8 and 9, show EMI compliance solutions which were developed for two notebooks in HP's Omnibook line of portable computer products.

In FIG. 8, a foil surface 70 (shown as cross-hatching) is disposed on one side of the surface of the illustrated tray. The foil 70 may be any suitable material, such as an adhesive sheet cut to size and shape, and then attached.

A multi-layer foil material may be used. For instance, the material may include an adhesive bottom, a conductive middle layer for providing the EMI shielding or coupling, and a top label layer which has information printed on it for the user to read, or which the user can write on. Also, if the material is merely a conductive metal layer with adhesive, information for the user to read may be embossed on the material.

In still other embodiments, the EMI-fix layer can be formed on the tray as part of the manufacturing process. For instance, a conductive paint may be applied over a suitable area, or in a suitable pattern. Also, an etching process, similar to that used in the fabrication of printed circuit boards, may be used. In embodiments where the second module is essentially a flat tray, it may be particularly advantageous to use a PC board-type manufacturing process.

In the particular embodiment shown, there is a narrow gap between the notebook (when it is installed) and the tray surface bearing the foil 70. Such a gap will, in some cases, be found to be necessary or desirable for the shielding or coupling necessary for EMI compliance. Also, the foil 70 wraps around a ribbed edge 72, and is bounded by other ribs 74, 76, and 78. It may only be a coincidence that a rib serves as a boundary for a needed EMI fix, or in some cases less foil is needed. However, considerations related to ease of manufacturing may make it convenient to lay foil all the way to rib boundaries, even if this is more foil than is needed for EMI compliance.

An EMI fix as shown in FIG. 8 may be used to provide capacitive coupling for EMI compliance. An electrical grounding contact is provided from the first module to the second module (not necessarily to the notebook itself). The contact may be any suitable structure, but preferably takes the form of a grounded spring contact on the first module, facing the bottom of the second module where the foil 70 is positioned.

In FIG. 9, a foil surface 80 is disposed on the top side of the illustrated tray. However, to position the foil surface 80 closer to the notebook for different coupling effects, a spacer 82, preferably a flat piece of non-conductive material, is disposed on the tray. It may be possible to simply make that part of the tray a bit thicker, to reposition the foil. However, depending on where in the product development cycle it is found that the foil positioning is necessary, use of the separate spacer may be more expedient than retooling the tray altogether.

Again, the foil 80 is wrapped around an edge 84. A label 86, bearing an information legend, is disposed over the foil 80. Again, the foil 80 may be a multilayer material having adhesive, a conductive layer, and an information-bearing or writable top layer.

Figure 10:
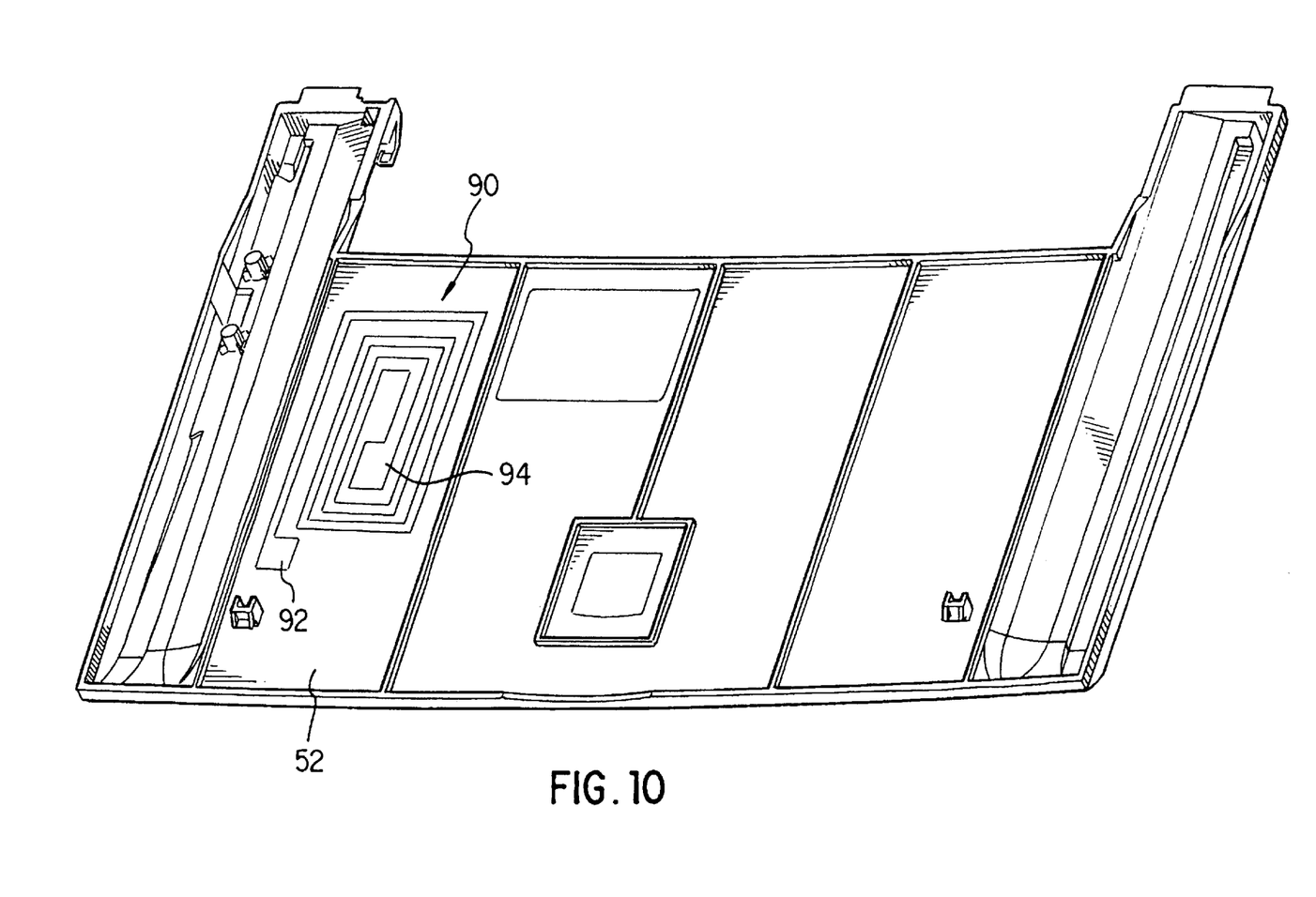
FIG. 10 is a perspective view, from the bottom, of a docking module, similar to that of FIG. 7, including a third embodiment of the invention.

FIG. 10 shows yet another embodiment of the invention. By contrast with FIGS. 8 and 9, which provide capacitive coupling by means of planes of conductive material, FIG. 10 bears an EMI fix which provides inductive coupling.

The EMI fix is shown as a coil 90 disposed on the surface 52 of the tray. The coil 90 may be an adhesive foil applique, a pattern made from conductive paint, etc., similarly to the embodiments discussed above.

The EMI fixes may, in fact, be formed as printed circuits, using the tray itself as substrate material. Even custom PC circuit traces forming localized coupling paths could be used as a method to reduce EMI in each particular system.

Ends 92 and 94 of the coil 90, at predetermined positions on the surface 52, serve as contact points. As before, contact members such as springs, built and wired into the first module, provide grounding, current, or the like. If the configuration of the coil and the necessary placement of contact points are not mutually convenient, then an optional additional line may be run on the opposite surface of the tray, coupled to the coil 90 by a plated-through hole or the like.

Also, series components (resistors, capacitors, etc.) may be employed as needed. Suitably positioned breaks in the coil 90 allow for the placement of these components, and for their electrical coupling across the break.

ADDITIONAL EMBODIMENTS OF THE INVENTION

The problem may exist were two notebooks share the same tray and have different EMI solutions. The advantage to this custom tray solution is to allow the possibility to provide a new custom tray with the unique EMI solution for each product rather than not providing an adequate or barely adequate solution for each notebook being used.

When a new notebook is designed for the old dock, the EMI can be fixed in the new notebook, modifying the dock (and affecting all the old notebooks that were working with the dock), or modifying the tray custom to that new notebook. These were done with applying or cutting out pieces of metal. Selectively applying conductive paint is another technique.

Standard EMI reduction techniques could be applied, such as metallization of the tray to localize the coupling. The particular metal, or conductive material, may be chosen for enhanced coupling or absorption properties.

Solutions may be either "active" (including circuit components) or "passive" (merely containing conductive paths, surfaces, etc.).

Passive structures are regarded as preferred embodiments, among other reasons because of their simplicity and low cost of manufacture. Passive structures may include antennas fixed to the tray to redirect radiation. Passive antennas or patch antennas, in a confined space, absorb, redirect, or otherwise affect the radiation patterns or energy.

Active structures could be applied, where additional connections to the tray could allow active reduction techniques of enhanced coupling that would allow the energy to be canceled or redirected or absorbed within the docking or base product. For instance, selective coupling circuits may be used for tuning solutions.

APPLICABILITY OF INVENTION TO ELECTROSTATIC DISCHARGE

While the invention, as described, has particular applicability to EMI compliance, similar structures, approaches, etc., similar techniques may also be used for electrostatic discharge (ESD) design. It is frequently the case that conductive structures, such as corners and sharp edges, which are apt to product unacceptable electromagnetic fields are also prone to undesirable secondary electrostatic discharge.

In accordance with the invention, capacitive or inductive paths reroute energy bursts to safe, or safer, locations within the docking apparatus, to protect static-sensitive components as well as to avoid the generation of radiating patterns or fields.

It may thus be said, broadly, that the invention achieves a desired electrical characteristic, that characteristic being either EMI compliance or ESD. Further, the equipment, such as a portable computer, may be broadly stated to have an electromagnetic property, which may be either an electromagnetic radiation property or an electrostatic property. In accordance with the invention, structures within the docking apparatus are designed, in light of the known electromagnetic property of the computer to be used with the second module, such that the combination of the first module, the corresponding computer and second module, and any additional structures being about the electrical characteristic.

What is claimed is:

1. A docking apparatus or coupling one of a set of pieces of equipment to an interface through an interface coupling, the apparatus comprising:

a first module including the interface coupling; and a second module, selected from a set of respective second modules, the second modules corresponding with respective ones of the pieces of equipment, the selected second module corresponding with the one of the different pieces of electronic equipment for coupling to the piece of equipment, each of the pieces of equipment having a respective electromagnetic property, each of the second modules including an electrical structure which, cooperatively with the respective piece of electronic equipment, brings about a desired electrical characteristic;

whereby when the one of the pieces of equipment is docked with the first module and the selected second module, the desired electrical characteristic is achieved;and wherein the second module has a surface, and the electrical structure includes a conductive foil disposed on the surface.

2. A docking apparatus as recited in claim 1, wherein the desired electrical characteristic includes one of (i) compliance with electromagnetic interference (EMI)requirements, and (ii) electrostatic discharge (ESD).

3. The docking apparatus as recited in claim 1, wherein:

the set of pieces of equipment includes a set of different models of portable computers; and the interface includes a standard interface to a computer peripheral device.

4. The docking apparatus as recited in claim 3, wherein each of the set of second modules includes a tray structure for holding the respective one of the portable computers, each of the tray structures including with the first module.

5. The docking apparatus as recited in claim 1, wherein the conductive foil has an adhesive surface for adhering to the second module surface.

6. The docking apparatus as recited in claim 1, wherein the conductive foil has a label thereon, the label bearing user-readable information.

7. A docking apparatus for coupling one of a set of pieces of equipment to an interface through an interface coupling, the apparatus comprising:

a first module including the interface coupling; and a second module, selected from a set of respective second modules, the second modules corresponding with respective ones of the pieces of equipment, the selected second module corresponding with one of the different pieces of electronic equipment for coupling to the piece of equipment, each of the pieces of equipment having a respective electromagnetic property, each of the second modules including an electrical structure which, cooperatively with the respective piece of electronic equipment, brings about a desired electrical characteristic;

whereby when one of the pieces of equipment is docked with the first module and the selected second module, the desired electrical characteristic is achieved; and wherein the second module has a surface, and the electrical structure includes conductive paint disposed on the surface.

8. A docking apparatus for coupling one of a set of pieces of equipment to an interface through an interface coupling, the apparatus comprising:

a first module including the interface coupling; and a second module, selected from a set of respective second modules, the second modules corresponding with respective ones of the pieces of equipment, the selected second module corresponding with one of the different pieces of electronic equipment for coupling to the piece of equipment, each of the pieces of equipment having a respective electromagnetic property, each of the second modules including an electrical structure which, cooperatively with the respective piece of electronic equipment, brings about a desired electrical characteristic;

whereby when one of the pieces of equipment is docked with the first module and the selected second module, the desired electrical characteristic is achieved; and wherein the electrical structure includes a planar structure for providing capacitive coupling.

9. A docking apparatus for coupling one of a set of pieces of equipment to an interface through an interface coupling, the apparatus comprising:

a first module including the interface coupling; and a second module, selected from a set of respective second modules, the second modules corresponding with respective ones of the pieces of equipment, the selected second module corresponding with one of the different pieces of electronic equipment for coupling to the piece of equipment, each of the pieces of equipment having a respective electromagnetic property, each of the second modules including an electrical structure which, cooperatively with the respective piece of electronic equipment, brings about a desired electrical characteristic;

whereby when one of the pieces of equipment is docked with the first module and the selected second module, the desired electrical characteristic is achieved; and wherein the electrical structure includes a pattern for providing inductive coupling.

10. The docking apparatus as recited in claim 9, wherein the electrical structure further includes an electronic component.

11. The docking apparatus as recited in claim 9, wherein the electrical structure further includes an antenna.

* * * * *